Aug. 23, 1960 M. E. HINES 2,950,384

MICROWAVE FREQUENCY CONVERTER

Filed Oct. 22, 1957

INVENTOR
M. E. HINES
BY Roy M. Porter Jr.

ATTORNEY

United States Patent Office 2,950,384

Patented Aug. 23, 1960

2,950,384

MICROWAVE FREQUENCY CONVERTER

Marion E. Hines, Summit, N.J., assignor to Bell Telephone Laboratories, Incorporated, New York, N.Y., a corporation of New York Filed Oct. 22, 1957, Ser. No. 691,694

4 Claims. (Cl. 250—20)

Figures 1, 2, 3:
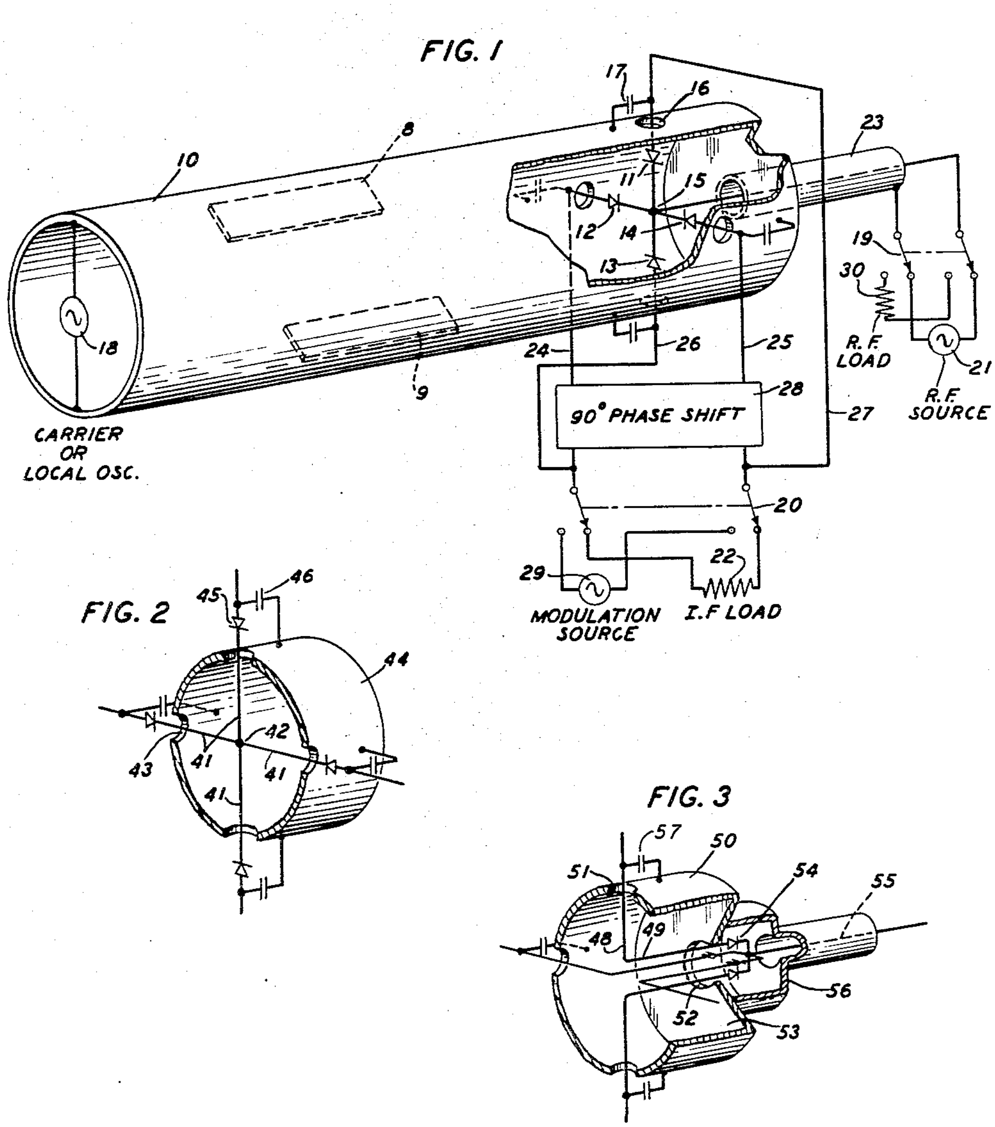

This invention relates to electromagnetic wave modulators or frequency changing systems for wave energy in the microwave or higher frequency range and, more particularly, to a system for modulating microwave energy wherein no carrier frequency, image frequency or undesired sideband frequencies are developed in the output of the modulator.

It is well known that where currents of two different frequencies are mixed or combined and applied to a nonlinear impedance element, there will be present in the output of the element both of these frequencies together with modulation products representing the sum and difference of the original frequencies and the harmonics thereof. If the lower of the original frequencies is the modulating signal and the higher the carrier signal as in a transmitting modulator, the significant product frequencies are known as upper and lower sideband frequencies, spaced respectively above and below the carrier by the frequency of the modulation. When the original frequency and the modulating frequency have a relatively small difference therebetween, as in a heterodyne frequency changer, the lower sideband is known as the intermediate frequency and little atention is paid to the upper sideband. However, a frequency which will herein be identified as the image frequency becomes significant. This is a frequency spaced on the other side of the carrier frequency from the other original frequency by the intermediate frequency.

It is equally well known that there are numerous advantages in suppressing one or more of these modulation products while producing only the one that is desired. For example, when modulating intelligence upon a carrier of high frequency in a single sideband transmitter, one sideband and the carrier are suppressed for reasons of economy of power and bandwith. Similarly, when reducing frequency from a radio transmission frequency to an intermediate frequency in the first detector of a radio receiver, it is often desirable to suppress response of the modulator to the image frequency. In most cases, conversion losses are substantially reduced by eliminating the production of undesired modulation products such as the unnecessary sidebands and harmonics.

It is, therefore, an object of the present invention to modulate a broadband microwave signal without producing unnecessary sidebands, images, or unnecessary carrier components.

It is a further object to increase the conversion efficiency of microwave modulators.

In accordance with the present invention, a new advantage is taken of the well known principle that if the signal to be modulated is divided into a plurality of portions and each portion is mixed in a specifically different phase with the modulating signal, the various modulation products in one portion will have different phase relationships with respect to the corresponding components in other portions. Thus, by judiciously recombining the portions, the undesired products may be combined in cancelling phase while the desired products will be reinforced. Particularly, the present invention provides a broadband microwave structure in which the high frequency signal is applied in phase to four nonlinear devices disposed radially in the path of circularly polarized local oscillator power so that the devices are excited 90 degrees apart in phase by the oscillator power. Modulation products are developed across each device 90 degrees apart in phase. The output signal is then derived by first making a series combination of the signal developed across diametrically opposite devices. This cancels the original radio frequency signal and harmonics thereof and leaves two sets of modulation product signals in phase quadrature. For certain of these products, such as the lower sideband, the phase of the signal across one set of devices leads that across the other by 90 degrees and for the other modulation products, such as the upper sideband, the relative phase is lagging. A 90 degree phase delay is then introduced to the signal across the one set so that upon parallel combination with the signal across the other set only the desired lower sideband frequency appears in the output.

This method of operation, and the various objects, features and advantages of the invention will appear more fully upon consideration in the following detailed description taken in connection with the illustrative drawings:

Fig. 1 is a perspective view of an illustrative embodiment of the invention showing connections for frequency converting and modulating operations; and Figs. 2 and 3 are cutaway perspective views illustrating alternative arrangements for the nonlinear arrangements of Fig. 1.

Referring more particularly to Fig. 1, an illustrative embodiment of a modulator in accordance with the invention is shown comprising a section 10 of conductively bounded wave guide adapted to support linearly polarized electromagnetic wave energy in orthogonal polarizations and therefore capable of supporting a circularly polarized wave. As illustrated, guide 10 is of circular cross section but it might also be square with cross-sectional dimensions sufficient to support the dominant mode of a linearly polarized wave in the two possible cross polarizations. Toward one end of guide 10, four nonlinear impedance elements 11 through 14 are coupled respectively to a positive vertically polarized wave, a positive horizontally polarized wave, a negative vertically polarized wave and a negative horizontally polarized wave in guide 10, these being the quadrature components which in proper phase make up a circularly polarized wave. Elements 11 through 14 may be silicon rectifiers that are small enough to be disposed in a radial manner within guide 10. Like electrodes are connected at a common point 15 at the center of guide 10 and the other electrode of each extends radially outward from guide 10 through pass-through members comprising apertures 16 displaced 90 degrees around the circumference of guide 10. The nonlinear elements, however, may be crystal rectifiers of any other material known to be effective in the microwave and higher frequency ranges. If these elements are not conveniently small enough to be disposed within guide 10, they may be located outside thereof as will be shown in connection with Figs. 2 and 3. The radial ends of elements 11 through 14 are connected to the conductive boundary of guide 10 through capacitors 17 which have a low reactance at the radio frequency and carrier frequency and a high reactance at the intermediate frequency or modulating frequency. In accordance with usual practice, capacitors 17 may be formed as a part of the pass-through elements by restricting the size of apertures 16 and filling them with a suitable dielectric material. Local oscillator power or carrier signal power from source 18 is applied as a linearly polarized wave to the other end of guide 10 in a given plane of polarization.

Suitable means for producing a conversion between the linearly polarized wave derived from source 18 and the circularly polarized wave supportable in guide 10 is located between source 18 and elements 11 through 14. As illustrated, this means may be a 90 degree differential phase shift section of any of the types disclosed, for example, in "Principles and Applications of Wave Guide Transmission" by G. C. Southworth, 1950, pages 327–331. By way of specific illustration, the phase shift section comprises two oppositely positioned metal fins 8 and 9 extending approximately one-quarter of the way across guide 10 and lying in a plane which is inclined at 45 degrees from the polarization of wave energy launched from source 18. As is well known, if the lengths of fins 8 and 9 are such that a 90 degree phase shift is introduced to wave energy polarized parallel to the plane of the fins relative to the wave energy polarized perpendicular to the plane of the fins, the linearly polarized wave derived from source 18 is converted into a circularly polarized wave in guide 10.

When employing the principles of the invention in a frequency converter a source 21 of radio frequency energy and an intermediate frequency load 22 are added to the circuit by placing switches 19 and 20 in the positions shown in the drawing. The radio frequency signal from source 21 is applied in parallel to elements 11 through 14 through coaxial conductor 23 having the center conductor thereof connected to the common point 15 and the outer conductor connected to the conductive boundary of guide 10. The high frequency current path through elements 11 through 14 is completed through capacitors 17.

The leads 24 and 25 from diametrically opposed elements 12 and 14 form a balanced transmission line at the intermediate frequency that is connected to phase shifter 28. Phase shifter 28 includes reactive elements of known types in standard configurations and is adapted to introduce a broadband phase shift of 90 degrees to intermediate frequency currents. The output of phase shifter 28 is connected in parallel with the leads 26 and 27 from the other pair of diametrically opposed elements 11 and 13 and the parallel output is then applied to switch 20 for connection to load 22.

The operation of the embodiment thus far described may be analyzed as follows:

If the local oscillator signal from source 18 is applied alone to guide 10, it will be converted into a circularly polarized wave by fins 8 and 9 and applied to elements 11 through 14. Since the coupling of coaxial 23 to guide 10 by way of elements 11 through 14 is balanced with respect to this local oscillator signal, none of the local oscillator frequency will appear in coaxial 23. Since this local oscillator signal is circularly polarized, it causes each of the nonlinear elements 11 through 14 to conduct in turn for approximately one-quarter of a cycle. Defining the voltage developed across the diametrically opposite pair of elements 12 and 14 as lagging the voltage developed across elements 11 and 13 by 90 degrees, the output of phase shifter 28 is out of phase with the voltage across leads 26 and 27 and so, if the signals are equal, no local oscillator signal reaches load 22. On the other hand, a radio frequency applied in the absence of a local oscillator will cause all of elements 11 through 14 to conduct in phase but since the voltages across opposite elements combine in opposite senses, the radio frequency signal is balanced with respect to both guide 10 and load 22.

When both local oscillator and radio frequency signals are applied simultaneously, there will be at some instant of time a temporary coincidence of phase therebetween at one of the elements, for example, element 11. This coincidence may last for a number of cycles depending upon the difference in frequency between the signals. At element 13 there will be a corresponding out-of-phase relationship so that more rectified current will be conducted by element 11 and correspondingly less by element 13. During this period the radio frequency signal and the local oscillator signal will be 90 degrees out of phase at elements 12 and 14, and they will generate substantially equal rectified currents. Gradually the phase between the local oscillator signal and the radio frequency signal will shift so that at a later period of time the in-phase coincidence will appear at an adjacent element, such as element 12, with an out-of-phase coincidence at element 14. The phase coincident condition moves around the circle from one element to another and eventually makes a complete cycle. A moment's reflection will indicate that the frequency of one complete cycle is that of the frequency difference between the local oscillator frequency and the radio frequency. The direction in which the rotation takes place depends upon whether the applied signal is higher or lower in frequency than the local oscillator. The effect may be likened to that observed when a stroboscope is being synchronized upon a rotating disc, i.e., the disc appears to rotate in one direction at the difference frequency when the difference is positive and in the opposite direction when the difference is negative. Thus, an undesired image frequency signal on the other side of the local oscillator from the desired radio frequency signal would produce a difference component rotating in the opposite direction from the component produced by the radio frequency signal. Not quite so easy to visualize is the production of sum frequencies rotating in each case in the opposite direction from the difference frequencies.

Thus, there is available across one set of elements 11 and 13 a signal including sum components, difference components and image components. There is similarly available across the second set of elements 12 and 14 the same components having phases in quadrature with the corresponding components of the first set. Defining the difference component across the first set as lagging the difference component across the second set, the sum components and the image components across the first set lead corresponding components across the second set. Therefore, when signals from the second set are delayed 90 degrees by phase shifter 28, the image components and the sum components are canceled while the difference components are reinforced and passed to load 22. By reversing the connection between the two sets, by shifting the position of phase shifter 28 or by reversing the sense of circular polarization, other components can be reinforced and the difference component canceled.

It should be noted that the present invention has a particular advantage when employed in a homodyne system, i.e., the particularly sensitive receiving system in which a modulated carrier is heterodyned with a local oscillator of the same frequency to detect the baseband modulation. Operation of most homodyne receivers is complicated by the fact that the exact phase of the received modulated signal is unpredictable. However, the arrangement according to the present invention is independent of the phase of the received signal since at least one or more of devices 11 through 14 will at all times be excited by a local oscillator signal of suitable phase to mix with the received signal and produce a baseband output.

The present invention has advantages when employed as a modulator that are similar to those described for the frequency changer. This use may be realized by connecting a modulating source 29 and a radio frequency load 30 by placing switches 19 and 20 in the other position from that shown. Inasmuch as the modulating operation made possible by such a connection is simply the converse of the frequency changing operation described in detail, it should be sufficient to state that the carrier power combines with the two-phase modulating power (one phase being derived directly from source 29 and the other phase being derived by way of phase shifter 28) to produce a resultant, rotating in sequence around elements 11 through 14 at either the sum frequency or the difference frequency therebetween depending upon the specific connection of phase shifter 28. The rotating resultant appears as an amplitude modulated wave upon coaxial line 23 which is balanced with respect to either the carrier frequency or the modulating frequency alone. Thus, a single sideband output is produced without the conversion loss that would exist if an undesired sideband was produced and then suppressed.

For low power operation, the elements 11 through 14 may be small enough to be disposed within guide 10 as illustrated in Fig. 1. For high power applications, their disposition outside the guide is preferable. Thus, Fig. 2 represents one arrangement in which spoke-like conductors 41 extend radially from a common point 42 through low capacity apertures 43 in guide 44. Rectifying elements 45 are disposed outside guide 44 with similar electrodes connected to conductors 41 and the remaining electrodes thereof returned to the conductive boundary of the wave guide through capacitors 46.

An alternative arrangement is illustrated in Fig. 3 in which conductors having a radial portion 48 and a parallel axial portion 49 are disposed within guide 50. The ends of the radial portion extend through apertures 51 and are connected to capacitors 57. The ends of the axial portions extend through aperture 52 in end wall 53 of guide 50. Elements 54 are connected between the end of each conductor and the center conductor 55 of the radio frequency coaxial line. An enlarged end portion 56 of the outer coaxial conductor is connected to wall 53 and forms a shield around elements 54.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. In combination, means for supporting electro-magnetic wave energy at a first frequency in a circularly polarized mode, a plurality of nonlinear impedance elements respectively coupled to quadrature components of said circularly polarized wave energy, means for coupling with a voltage at a second frequency in parallel with said elements, and means for coupling at a third frequency with the voltage difference across two of said elements.

2. In combination, means for supporting electro-magnetic wave energy in a circularly polarized mode, four nonlinear impedance elements respectively coupled to quadrature components of said circularly polarized mode, means for coupling with a first voltage supported in parallel with said elements, means for coupling with a second voltage supported as the difference voltage across two of said elements, means for coupling with a third voltage supported as the difference voltage across the remaining two of said elements, and means for shifting the phase therebetween by 90 degrees and for combining said second and third voltages.

3. A microwave converter comprising four nonlinear impedance elements, means for applying a signal of a first frequency in parallel with said elements, means for applying local oscillator signal power successively to each of said elements with a 90 degree relative phase, and means for obtaining a voltage developed across two of said elements and for shifting the phase thereof by 90 degrees and for combining it in parallel with a voltage developed across the remaining two of said elements.

4. In combination, a conductively bounded wave guide, a source of linearly polarized electromagnetic wave energy coupled to said guide, means interposed in said guide for converting said linear polarization into a circular polarization, four nonlinear impedance elements being coupled to radial polarizations of said circularly polarized wave in said guide with one electrode of each connected at a common point, a two-conductor transmission line having one conductor thereof connected to said common point and the other conductor connected for high frequency wave energy to the other electrode of each of said elements, a second two-conductor transmission line having one end connected between said other electrodes of two of said elements, a third two-conductor transmission line having one end connected between said other electrodes of two other of said elements and the other end thereof connected in parallel with the other end of said second line, and phase shift means interposed in one of said last-named transmission lines.

References Cited in the file of this patent

UNITED STATES PATENTS

| | | |
|---|---|---|
| 1,773,116 | Potter | Aug. 19, 1930 |
| 2,142,159 | Southworth | Jan. 3, 1939 |
| 2,443,612 | Fox | June 22, 1948 |
| 2,458,579 | Feldman | Jan. 11, 1949 |
| 2,533,599 | Marie | Dec. 12, 1950 |
| 2,584,986 | Clark | Feb. 12, 1952 |
| 2,645,710 | Hartz | July 14, 1953 |